United States Patent
Götzinger et al.

(10) Patent No.: US 6,908,144 B2
(45) Date of Patent: Jun. 21, 2005

(54) FASTENING ELEMENT FOR PART OF A TRIM INSIDE A MOTOR VEHICLE

(75) Inventors: Bruno Götzinger, Weinitzen (AT); Jürgen Schaffer, Gratwein (AT); Klaus Hausberger, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 10/468,411

(22) PCT Filed: Mar. 7, 2002

(86) PCT No.: PCT/AT02/00072

§ 371 (c)(1),
(2), (4) Date: Aug. 19, 2003

(87) PCT Pub. No.: WO02/070304

PCT Pub. Date: Sep. 12, 2002

(65) Prior Publication Data

US 2004/0074056 A1 Apr. 22, 2004

(30) Foreign Application Priority Data

Mar. 7, 2001 (AT) .................................. GM168/2001

(51) Int. Cl.⁷ .............................................. B60R 13/02
(52) U.S. Cl. ................. 296/187.05; 296/1.08; 296/39.1; 24/289
(58) Field of Search ..................... 296/187.05, 187.06, 296/187.02, 29, 146.7, 1.08, 186.5, 39.1, 39.3; 24/289; 428/31; 293/128; 280/751, 752

(56) References Cited

U.S. PATENT DOCUMENTS

| 4,400,336 A | * | 8/1983 | Thomas ..................... 264/46.7 |
| 4,472,918 A | * | 9/1984 | Mach .......................... 52/511 |
| 5,322,400 A | * | 6/1994 | Ford .......................... 411/171 |
| 5,542,691 A | * | 8/1996 | Marjanski et al. ........ 280/728.2 |
| 5,580,116 A | | 12/1996 | Patel et al. |
| 5,803,532 A | | 9/1998 | Karuppaswamy et al. |
| 5,964,017 A | * | 10/1999 | Roberts ...................... 29/91.1 |
| 6,318,797 B1 | * | 11/2001 | Bohm et al. ................ 296/210 |
| 6,379,092 B1 | * | 4/2002 | Patel et al. ................... 411/61 |
| 6,409,258 B1 | * | 6/2002 | Grimm et al. ......... 296/216.08 |
| 2002/0101109 A1 | * | 8/2002 | Stiller et al. ............. 297/452.6 |
| 2003/0162008 A1 | * | 8/2003 | Cappucci et al. ........ 428/304.4 |

* cited by examiner

*Primary Examiner*—Joseph D. Pape
(74) *Attorney, Agent, or Firm*—Bachman & LaPointe, P.C.

(57) ABSTRACT

Fastening element for a trim panel in the interior of a motor vehicle, said fastening element being fastened between a structural part (1) of the motor vehicle and the trim panel in such a manner that the trim panel can be removed, and foam being provided between the trim panel and structural part. In order, with reduced costs for manufacturing and logistics, to be able to absorb a large amount of work of deformation and to be exchangeable, the fastening element (5) itself is a body which consists of light metal foam, in which at least one insert (8) is integrated, said insert being exposed on the side which faces the trim panel (15), and wherein the trim panel is fastened releasably to the exposed part (9) formed in this manner.

10 Claims, 1 Drawing Sheet

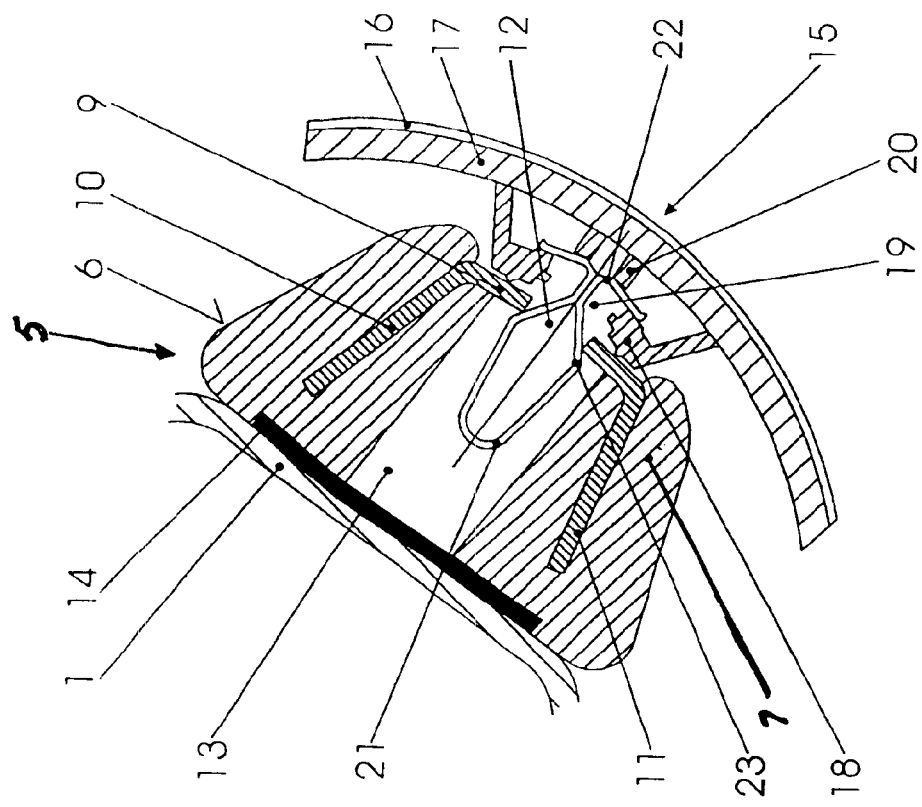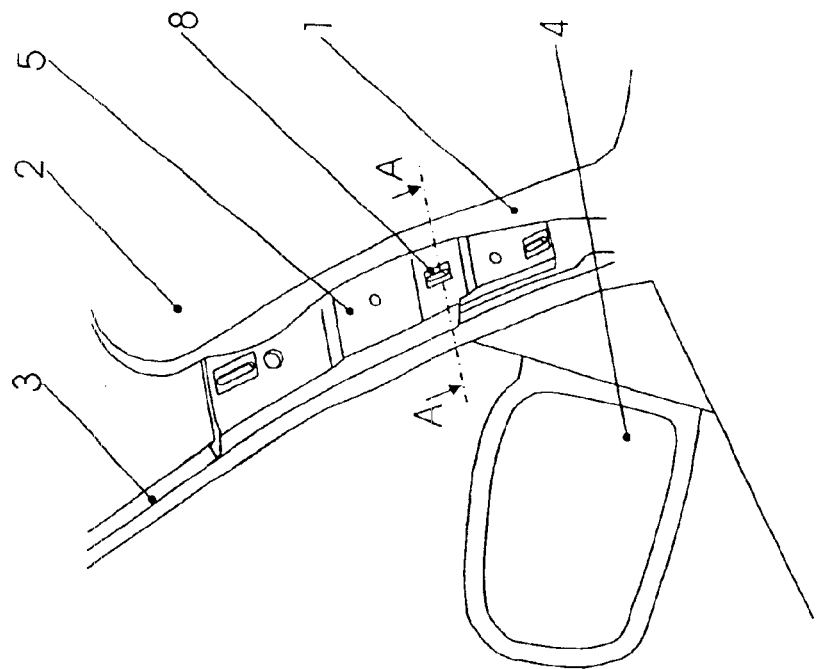

FASTENING ELEMENT FOR PART OF A TRIM INSIDE A MOTOR VEHICLE

BACKGROUND OF THE INVENTION

The invention relates to a fastening element for a trim panel in the interior of a motor vehicle, said fastening element being fastened between a structural part of the motor vehicle and the trim panel in such a manner that the trim panel can be removed, and foam being provided between the trim panel and structural part. In particular, the fastening of trim panels of one of the side pillars (for example the A-pillar) or of the roof strut is intended here.

The fastening of such a trim panel has to satisfy different requirements, in particular the trim panel is to absorb work of deformation in the event of a collision to a sufficient extent and is also to be removable and exchangeable; the latter facilitates the stock-keeping for interior panels in different materials and colors. Known solutions either do not fully meet both requirements, or they are complex and consist of a large number of parts, which increases the costs for manufacturing and logistics.

U.S. Pat. No. 5,803,532 discloses an interior trim panel which itself has, on its invisible side, a foam body and struts, which reach through the foam body and are held in the structural part. The foam body together with a thin-walled plastic part forms the interior trim panel. This means, firstly, that a complete interior trim panel together with its fastening means has to be kept ready for each color and material variant. Unless stated otherwise, foam is generally understood to be a plastic foam, in particular a polyurethane foam. However, irrespective of the chemical setting of their hardness and strength, the capability of such foams to absorb deformation energy is very limited. In addition, open-pore foams may absorb and store moisture, which may lead to the structural parts being corroded.

U.S. Pat. No. 5,580,116 discloses a similar interior trim panel having the same disadvantages, said trim panel additionally also containing a small flat plate which is intended to prevent injuries to the occupants in the event of a collision due to a spot-welding edge, which is concealed beneath it. It does not have any task to fulfill in normal operation.

It is an object of the present invention to provide a fastening element for an interior trim panel which satisfies the above-mentioned requirements that is to absorb work of deformation, to be exchangeable, and have reduced costs for manufacturing and logistics.

SUMMARY OF THE INVENTION

The foregoing object is achieved by the present invention wherein the fastening element itself is a body which consists of light metal foam, in which at least one metallic insert is integrated, said insert being exposed on the side which faces the trim panel, and in that the trim panel is fastened releasably to the exposed part formed in this manner. The trim panel is thus simple and inexpensive, it can be kept ready in different materials and colors and the fastening element is always the same.

The light metal foam has, first of all, a substantially higher energy absorption capability for the same deformation distance. The fact that it is an intrinsic body avoids difficulties which might arise in connecting it to the trim panel. The insert permits the energy absorption to be modulated, for example to be configured to be progressive; furthermore, it permits dimensionally accurate installation of the interior trim panel and gives a large amount of freedom in terms of design.

The fastening element is preferably produced by powder metallurgy means and has a skin encasing its porous structure. This method of production offers a great deal of freedom in terms of design, permits the inserts to be encased with foam and is relatively cost-effective. In addition, an oxide skin which prevents the penetration of moisture is produced in the process.

A particularly intimate connection of metallic insert and the foam body is achieved if the former reaches with its parts adjacent to the exposed part into the depth of said foam body.

In a preferred embodiment, the metallic insert has, on its exposed part, a hole in which a part of the trim panel engages, a snap-on element securing the trim panel, and the foam body has a depression below the hole. The trim panel can thus be exchanged in a simple manner. The snap-on element can be attached either to the one or to the other part.

If the trim panel is elongate, the fastening element may also be an elongate body having a plurality of spaced apart metallic inserts. This permits adaptation to the structural part to be covered.

The connection of the fastening element to the structural part can be undertaken in different ways. It has proven particularly advantageous to take care of it by means of an adhesive tape. It considerably simplifies the installation and can even out small unevennesses in the two parts. It can do this to a particularly great extent if it consists of polyurethane and has a thickness of 0.5 to 2 millimeters. This has the further advantage that it becomes hardened under the rapidly increasing forces which occur in the event of a collision, and does not impair the properties of the light metal foam.

BRIEF DESCRIPTION OF THE DRAWINGS

The invention will be described and explained below with reference to figures, in which:

FIG. 1 shows an axonometric view of the fastening element according to the invention, installed in a motor vehicle, and FIG. 2 shows a section according to A—A in FIG. 1, on an enlarged scale.

DETAILED DESCRIPTION

In FIG. 1, the interior of a vehicle as it is presented to the driver can be seen. An A-pillar is referred to by 1 and a windshield 2 is on the one side and a door with a side window 3 is on the other side. For orientation purposes, an external rearview mirror 4 is indicated. A fastening element 5 can be seen on the A-pillar. The trim panel fastened thereto has been removed.

The fastening element 5 is an elongate body having a variable cross section and a considerable thickness. It consists of a light metal foam 7, in particular aluminum foam, and is produced by powder metallurgy means. The density of the foam is 0.4 to 0.6 gram/cm$^3$. During the production by powder metallurgy means, a skin 6 forms on the boundary surface of the foam of fastening element 5 and protects the fastening element 5, even against the penetration of moisture.

FIG. 2 shows the fastening element 5 in section. The skin covering its porous structure 7 is indicated and is referred to by 6. The fastening element 5 here contains a plurality of inserts 8 comprised by parts 10 and 11, one of which is sectioned in FIG. 2 and two further inserts can be seen in FIG. 1. These inserts are of similar width and, during the production of the foam body by powder metallurgy means, parts 10 and 11 are incased with foam in the latter. However, the insert could also extend over the entire length of the fastening element 5.

The insert 8 is clad with foam at its lateral parts 10, 1, which protrude into the depth of the fastening element 5, and emerges in between out of the foam body 7 and thus forms exposed parts 9 which define a hole 12 or a slot in the center. Below it, the foam body has a depression 13 which comprises a continuous bore. That side of the foam body which faces the sheet metal of the A-pillar 1 is connected to the sheet metal by means of an adhesive tape 14. It is preferably a polyurethane adhesive tape with a thickness of 0.5 to 2 millimeters. This material increases in hardness when suddenly subjected to a force and the considerable thickness of the tape evens out smaller unevennesses in the fastening element 5 or in the sheet metal of the A-pillar 1.

The fastening element 5 supports a trim panel 18. The latter consists of a visible layer 16 of plastic, fabric or leather and a plastic supporting layer 17, for example injected behind it. This supporting layer has, assigned to each hole 12 an insert 8, a bulge 18 with a hole 19 and two lugs 20 on its inner wall. A clip 21 composed of an elastic material is inserted into this bulge. Its foot 22 is held securely between the lugs 20 and the inner edge of the hole 19 and its belly reaches through the hole 12 of in the insert 8 and thus secures the trim panel 15.

The connection between the trim panel 15 and the insert 8 can be produced in various ways. Thus, for example, the spring-elastic parts could also be provided on the insert 8 or screws or other elements introduced from the visible side could be provided.

What is claimed is:

1. A fastening element for removably connecting a trim panel to a structural part of the interior of a motor vehicle wherein the fastening element allows the trim panel to be easily removed, the fastening element comprising:
    an elongated foam body having an energy absorption capability greater than that of the structural part, at least one insert integrated in the elongated foam body, the at least one insert having an exposed part for removably securing the trim panel thereto.

2. The fastening element as claimed in claim 1, wherein the foam body is a light metal foam is produced by powder metallurgy means and has a skin encasing the foam.

3. The fastening element as claimed in claim 1, wherein the insert comprises parts adjacent to the exposed part which are embedded into the foam body of the fastening element.

4. The fastening element as claimed in claim 3, wherein the exposed part includes a hole in which a part of the trim panel engages, and wherein the foam body has a bore below the hole.

5. The fastening element as claimed in claim 1, wherein the elongate foam body has a plurality of spaced apart inserts.

6. The fastening element as claimed in claim 1, wherein an adhesive tape is located on a portion of the foam body opposed to the at least one insert for attaching the foam body to the structural part of the motor vehicle.

7. The fastening element as claimed in claim 6, wherein the adhesive tape comprises polyurethane and has a thickness of 0.5 to 2 millimeters.

8. The fastening element as claimed in claim 1, wherein the foam has a density of between 0.4 to 0.6 gram/cm$^3$.

9. A fastening element for removably connecting a trim panel to a structural part of the interior of a motor vehicle wherein the fastening element allows the trim panel to be easily removed, the fastening element comprising: an elongated light metal foam body produced by powder metallurgy means and having a skin encasing the foam, at least one insert integrated in the elongated foam body, the at least one insert having an exposed part for removably securing the trim panel thereto.

10. A fastening element for removably connecting a trim panel to a structural part of the interior of a motor vehicle wherein the fastening element allows the trim panel to be easily removed, the fastening element comprising: an elongated foam body, at least one insert integrated in the elongated foam body, the at least one insert having an exposed part for removably securing the trim panel thereto, and an adhesive tape located on a portion of the foam body opposed to the at least one insert for attaching the foam body to the structural part of the motor vehicle.

* * * * *